(12) United States Patent
Heuer et al.

(10) Patent No.: US 7,844,895 B2
(45) Date of Patent: Nov. 30, 2010

(54) METHOD FOR IMPROVING THE FUNCTIONALITY OF A BINARY REPRESENTATION

(75) Inventors: Jorg Heuer, Munich (DE); Andreas Hutter, Munich (DE); Ulrich Niedermeier, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 817 days.

(21) Appl. No.: 11/617,909

(22) Filed: Dec. 29, 2006

(65) Prior Publication Data

US 2007/0112805 A1 May 17, 2007

Related U.S. Application Data

(63) Continuation of application No. 10/451,592, filed on Oct. 20, 2003, now Pat. No. 7,233,953.

(51) Int. Cl.
*G06F 17/00* (2006.01)
(52) U.S. Cl. ........................................ 715/234; 715/239
(58) Field of Classification Search ................... 715/239
See application file for complete search history.

(56) References Cited

U.S. PATENT DOCUMENTS

| | | | | |
|---|---|---|---|---|
| 5,379,355 | A | 1/1995 | Allen | ............................ 382/56 |
| 5,946,418 | A | 8/1999 | Yoneda | |
| 5,956,718 | A | 9/1999 | Olds | |
| 6,052,686 | A | 4/2000 | Fernandez et al. | |
| 6,209,124 | B1 * | 3/2001 | Vermeire et al. | ............. 717/114 |
| 6,292,114 | B1 * | 9/2001 | Tsai et al. | ...................... 341/67 |
| 6,345,126 | B1 | 2/2002 | Vishwanath et al. | |
| 6,498,612 | B1 | 12/2002 | Brown | |

(Continued)

FOREIGN PATENT DOCUMENTS

DE 10047338 A1 4/2002

(Continued)

OTHER PUBLICATIONS

Title: An Extensible Compressor for XML Datqa Author: Hartmut Liefke, Dan suciu Date Published: Mar. 1, 2000 Source: ACM SIGMOD Record Archive, vol. 29, Issue 1, pp. 57-62.*

(Continued)

*Primary Examiner*—Doug Hutton
*Assistant Examiner*—Mustafa Amin
(74) *Attorney, Agent, or Firm*—King & Spalding L.L.P.

(57) ABSTRACT

A method is provided for improving functionality of a binary representation of an XML-based content description, wherein a structure of any instance of an XML document corresponds to a tree-like data structure. The method includes providing that each tree node represents an element of the content description and has a structure defined in a schema; providing the tree nodes in the binary representation with tree branch codes; providing that the respective tree branch code has a schema branch code and, when appropriate, a position code; forming first and second tables for the schema branch codes when each node is being coded, the first table including complex elements containing child elements and the second table including complex elements as well as attributes and simple elements which represent leaves of the tree-like data structure; and forming a complete path by chaining together tree nodes in the binary representation.

1 Claim, 8 Drawing Sheets

U.S. PATENT DOCUMENTS

| | | | |
|---|---|---|---|
| 6,507,856 B1* | 1/2003 | Chen et al. | 715/205 |
| 6,665,677 B1 | 12/2003 | Wotring et al. | 707/100 |
| 6,671,416 B2* | 12/2003 | Vishwanath et al. | 382/253 |
| 6,671,853 B1* | 12/2003 | Burkett et al. | 715/235 |
| 6,772,180 B1 | 8/2004 | Li et al. | 707/513 |
| 6,804,677 B2 | 10/2004 | Cooper | |
| 6,825,781 B2 | 11/2004 | Seyrat et al. | |
| 6,883,137 B1* | 4/2005 | Girardot et al. | 715/242 |
| 6,978,269 B1 | 12/2005 | Johnson | |
| 7,233,953 B2 | 6/2007 | Heuer et al. | |
| 7,697,613 B2* | 4/2010 | Wollborn | 375/240.23 |
| 2002/0034333 A1 | 3/2002 | Vishwanath et al. | |
| 2002/0078032 A1 | 6/2002 | Hill | |
| 2002/0138514 A1* | 9/2002 | Rising et al. | 707/512 |
| 2002/0138517 A1* | 9/2002 | Mory et al. | 707/513 |
| 2002/0159519 A1 | 10/2002 | Tabatabei et al. | |
| 2002/0198901 A1* | 12/2002 | Ritchie et al. | 707/201 |
| 2002/0198905 A1 | 12/2002 | Tabatabei et al. | |
| 2003/0009472 A1 | 1/2003 | Azami et al. | |
| 2004/0068696 A1 | 4/2004 | Seyrat | |
| 2004/0109501 A1* | 6/2004 | Wollborn | 375/240.08 |
| 2004/0202246 A1* | 10/2004 | Watanabe et al. | 375/240.01 |

FOREIGN PATENT DOCUMENTS

| | | |
|---|---|---|
| EP | 1 122 655 A2 | 8/2001 |
| EP | 1158420 | 11/2001 |
| WO | WO 97/34240 A1 | 9/1997 |

OTHER PUBLICATIONS

Title: WAP Binary XML Content Format, Wireless Application Protocol Binary XML Content Format Specification Version 1.1 Date: Jun. 16, 1999 Url: <http://www.opengroup.org/testing/wap/wapdev1.1.6/tests/wap/specs/wbxml1.1.pdf>.*

Title: Effizente Codierung von XML Instanzen mit MPEG-7 BIM, Author: Jorg Heuer, Date: 2003, URL:<http://citeseerx.ist.psu.edu/viewdoc/download?doi=10.1.1.111.9781&rep=rep1&type=pdf>.*

Title: An MPEG-7 Tool for Compression and Streaming of XML Data, Author: Niedermeier et al. Date: Nov. 27, 2002, URL: <http://www.iti.gr/SCHEMA/files/document/27-11-2002/ICME_BiM.pdf>.*

Coding of moving pictures and associated audio: ISO/IEC JTC1/SC29/WG11/N3701 Oct. 2000 (La Baule) Text of ISO/IEC CD 15938-1 Information technology—Multimedia description interface—Part 1 System.

H. Liefke et al., "XMill: An Efficient Compressor for XML Data", Sigmond Record, Association for Computing Machinery, New York, US, vol. 29, No. 2, Jun. 2000, pp. 153-164.

WAP Binary XML Content Format, Wireless Application Protocol Binary XML Content Format Specification Version 1.1, Date: Jun. 16, 1999, URL: http://www.opengroup.org/testing/wap/wapdev1.1.6/tests/wap/specs/wbxml1.1.pdf; Other.

Hutter et al. "Improved Filtering Functionality for the Binary Representation of MPEG-7 Descriptions (BIM)" ITU study Group 16 - Video Coding Experts Group - ISO/IEC MPEG & ITU-T VCEG (ISO/IEC JTC1/SC29/WG11 and ITU-T SG16 Q6) XP020035933 (2 pages), Jan. 1, 2001.

Wollbom "Application Specific Extension Code for Binary MPEG-7 Data" International Organisation for Standardisation ISO/IEC JTC1/SC29/WG11 MPEG2001/6838 (5 pages), Jan. 1, 2001.

Hutter et al. "Support of Forward and Backward Compatibility for the Binary Representation of MPEG-7 Descriptions (BIM)" ITU Study Group 16 - Video Coding Experts Group - ISO/IEC MPEP & ITU-T VCEG (ISO/IEC UTC1/SC29/WG11 and ITU - T SG16 06) XP030035931 (8 pages), Jan. 1, 2001.

Heuer et al. "Results of CE on BIM: A generic Context Sensitive Encoding Scheme (CSE) for MPEG-7 Descriptions and MPEG - 7 Description Schemes" ITU Study Group 16 - Video Coding Experts Group - ISO/IEC MPEG & ITU-T VCEG (ISO/IEC JTC1/SC29/WG11 and ITU SG 16 Q6) Nr. M6613, 23 Book (18 pages), Oct. 1, 2000.

Wollbom et al. "BiM - A Binary format for MPEG-7 data." ITU Study Group 16 - Video Coding Experts Group - ISO/IEC MPEG & ITU Nr. 6574 (13 pages), Oct. 23, 2000.

Wollbom et al. "Binary Format for Multimedia Description Structures", ITU Study Group 16 - Video Coding Experts Group - ISO/IEC MPEG &ITU-T VCEG (ISO/IEC JTC1/SC29/WG11 and ITU-T SG16 Qt) (10 pages), May 26, 2000.

Beek et al. "Notes and Proposal on MPEG-7 Description Access" Sharp Laboratories of America. 7. TV Anytime Meeting; Geneva; FTP://FTP.BBC.CO.UK (6 pages), Jul. 14, 2000.

* cited by examiner

Prior Art

1. Addressing a Simple Type element / Attribute

| SBC-B | #pos | SBC-B | #pos | SBC-B | #pos | SBC-B |

FIG 1A

2. Addressing a Complex Type element

| SBC-B | #pos | SBC-B | #pos | SBC-B | #pos | SBC-B (Path Termination Code) |

FIG 1B

New method:

1. Addressing a Simple Type element / Attribute

| SBC-A | #pos | SBC-A | #pos | SBC-A | #pos | SBC-A (Path Termination Code) | SBC-B |

FIG 1C

2. Addressing a Complex Type element

| SBC-A | #pos | SBC-A | #pos | SBC-A | #pos | SBC-A (Path Termination Code) | SBC-B |

```
<xsd:complexType name="PurchaseOrderType">
    <xsd:sequence>
        <xsd:element name="shipTo" type="USAddress" />
        <xsd:element ref="comment" minOccurs="0" />
        <xsd:element name="items" type= "Items" />
    <xsd:sequence>
    <xsd:attribute name="orderDate" type="xsd:date" />
<xsd:complexType>
```

In this complexType specification, the element
"comment" and the attribute "orderDate" are of simple
type (this is generally the case for attributes)

FIG 2A

Node Table (for SBC-A)

| Purchase Order Type (Table A) | | |
|---|---|---|
| TBC | | Tree Branch |
| #SchemaBranch | #position | |
| 00 | -- | Reference to father |
| 01 | - | Reference to type "USAddress" |
| 10 | - | Reference to type "Items" |
| 11 | -- | Termination of the navigation path |

FIG 2B

Node Table (with SBC-B)

| Purchase Order Type (Table B) | | |
|---|---|---|
| TBC | | Tree Branch |
| #SchemaBranch | #position | |
| 000 | -- | Reference to father |
| 001 | - | Reference to type "USAddress" |
| 010 | - | Reference to type "comment" |
| 011 | - | Reference to type "Items" |
| 100 | - | Reference to type "xsd:date" |
| 101 | - | NULL |
| 110 | - | NULL |
| 111 | -- | NULL |

Prior Art

Previous method:

| SBC-B 1 | #pos 1 | SBC-B 2 | #pos 2 | SBC-B 3 | #pos 3 | SBC-B 4 | #pos 4 | SBC-B 5 | #pos 5 |

FIG. 3A

New method:

| Length L | SBC-B 1 | SBC-B 2 | SBC-B 3 | SBC-B 4 | SBC-B 5 | #pos 1 | #pos 2 | #pos 3 | #pos 4 | #pos 5 |

| Mpeg7BiMStream(){ | Number of bits | Mnemonic |
|---|---|---|
| M7_Startcode | 24 | bslbf |
| M7_ProfileAndLevelIndication | 5 | bslbf |
| M7_Version_ID | 4 | bslbf |
| M7_RootElement | 3 | bslbf |
| DS_Extension | 1 | bslbf |
| If (DS_Extension){ | | |
|    Extension_ID_length | 8 | |
|    Extension_ID | Extension_ID_length | |
|    DS_Update_Info() | | |
| } | | |
| While (RootCommand != exit_root){ | | |
|    BiM_Fragment() | | |
| } | | |
| } | | |

FIG 4B

| DS_Update_Info(){ | Number of bits | Mnemonic |
|---|---|---|
| Number_of_changed_nodes | | |
| for (i=0; i< Number_of_changed_nodes;i++){ | | |
| Navigation_Command | 2 | bslbf |
| Navigation_Path() | | |
| SBC_Length | | |
| } | | |

FIG 5A

| Extended TSN of an Element or Complex Type ||  |
|---|---|---|
| TBC || Tree Branch |
| #Schema Branch | #position |  |
| 000 | -- | Reference to father |
| 001 | Pos. Code | <Standard Element 1> |
| 010 | Pos. Code | <Standard Element 2> |
| 011 | --- | <Standard Path Termination> / <*Extended* Element 3> |
| 100 |  | <*Extended* Element 4> |
| 101 |  | <*Extended* Element 5> |
| 110 |  | <*Extended* Element 6> |
| 111 | -- | <*Extended* Path Termination> |

FIG 5B

Extended TSN of a modified schema

| TBC | Referenced element |
|---|---|
| 000 | <Father> |
| 001 | <Standard Element 1> |
| 010 | <Standard Element 2> |
| 011 | <Standard Path Termination> / <*Extended* Element 3> |
| 100 | <*Extended* Element 5> |
| 101 | <*Extended* Element 6> |
| 110 | <*Extended* Element 6> |
| 111 | <*Extended* Path Termination> |

FIG 6A

The extensions are highlighted in boldface:

```
<xsd:complexType name="PurchaseOrderType">
    <xsd:sequence>
        <xsd:element name="shipTo" type="USAddress" />
        <xsd:element name="billTo" type="USAddress" minOccurs="0" />
        <xsd:element ref="comment" minOccurs="0" />
        <xsd:element name="items" type="Items" />
        <xsd:element ref="MethodOfPayment" minOccurs="0" />
        <xsd:element ref="BankData" minOccurs="0" />
    </xsd:sequence>
    <xsd:attribute name="orderDate" type="xsd:date" />
</xsd:complexType>
```

FIG 6B

| Purchase Order Type (Table B) |||
|---|---|---|
| TBC || Tree Branch |
| #SchemaBranch | #position ||
| 0000 | -- | Reference to father |
| 0001 | - | Reference to type "USAddress" |
| 0010 | - | Reference to type "comment" |
| 0011 | - | Reference to type "items" |
| 0100 | - | Reference to type "xsd:date" |
| 0101 | - | Reference to type "billTo" |
| 0110 | - | Reference to type "MethodOfPayment" |
| 0111 | - | Reference to type "BankData" |
| --- | - | NULL |
| 1111 | -- | Termination of the navigation path |

METHOD FOR IMPROVING THE FUNCTIONALITY OF A BINARY REPRESENTATION

PRIORITY CLAIM

This application is a continuation of application Ser. No. 10/451,592, titled "METHOD FOR IMPROVING THE FUNCTIONALITY OF THE BINARY REPRESENTATION OF MPEG-7 AND OTHER XML-BASED CONTENT DESCRIPTIONS," filed Oct. 20, 2003, the entire contents of which are incorporated herein.

BACKGROUND OF THE INVENTION

The present invention relates to the coding and decoding of structured documents based on XML, such as are provided for by MPEG-7, for example. XML (extensible markup language) is a standard for the definition of document structures. It is used for representing structured data in a text file and forms the basis for the language XHTML, for example. Such documents structured on an XML basis are based on a set of structured elements, also referred to in the following as a "schema", such as can be specified using, for example, a document type definition (DTD), an XML schema, or multimedia description schemes (DS).

A draft paper from the ISO/IEC, namely CD 15938-1 Information Technology—Multimedia Content Description Interface: Systems, ISO/IEC JTC 1 SC29/WG11/N3701, La Baule (France), October 2000, in particular on pages 15 to 22, discloses the binary format of MPEG-7 files and the structure of navigation paths using tree branch code tables.

The present invention is concerned with the optimization of the coding of structured XML documents. An object of the present invention is, thus, to specify methods for improving the functionality of the binary representations of XML-based content descriptions, particularly for MPEG-7 documents, using which the data set to be transmitted will be as small as possible, search operations within the document will be as simple as possible, and any extensions to an instanced document which are not contained in the schema template can be effected with the least possible effort.

SUMMARY OF THE INVENTION

Figure 2:
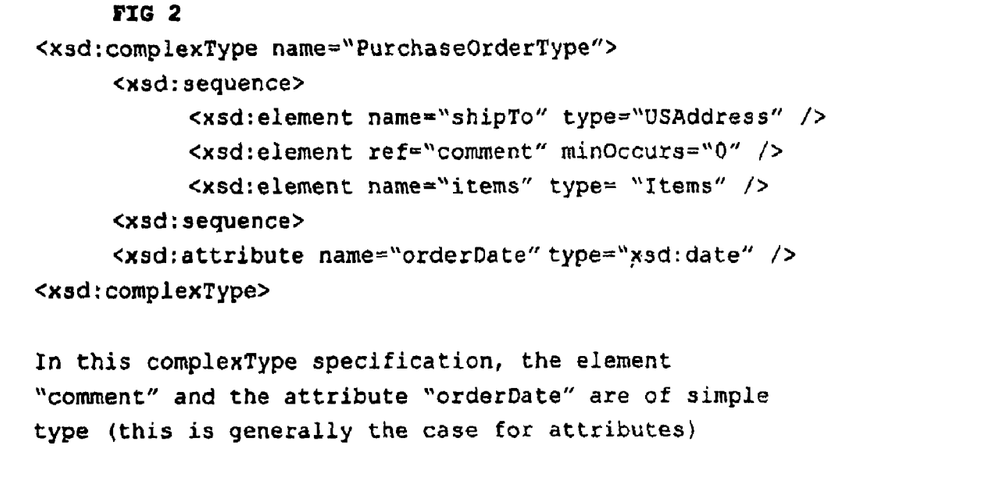
FIG. 2 shows an XML schema text.
Figure 2A:
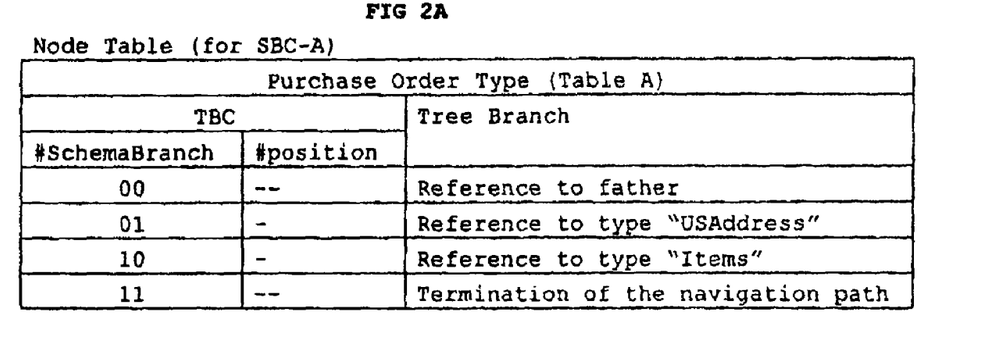
FIGS. 2a and 2b show the node tables for the schema text in FIG. 2.
Figure 2B:
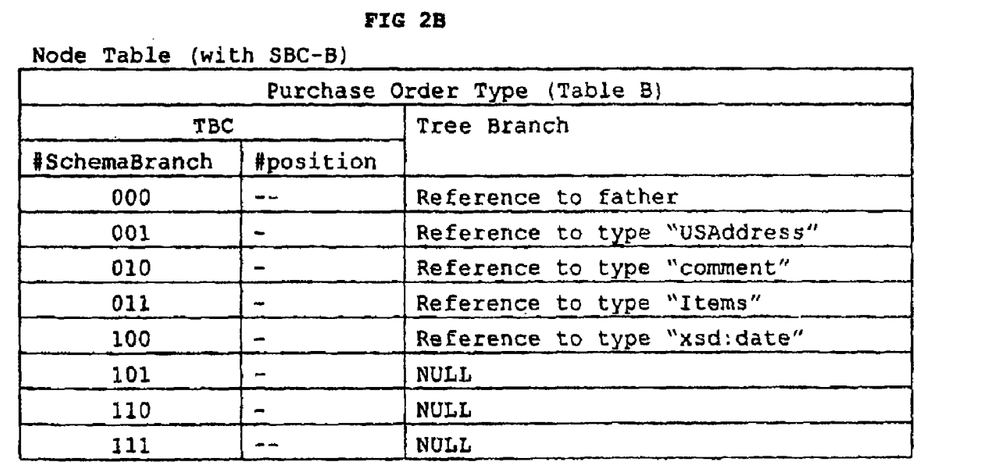

One of the consequences of the ISO/IEC draft mentioned above is that the structure of an XML document can be interpreted as a data tree, where each element of the description corresponds to a node in this tree. The structure of the nodes is defined by the definition in the schema on which the document is based. In particular, the type and number of child-elements are defined by it. An example of a prototype for such a node is shown in FIGS. 2, 2a, and 2b. These tree-structure nodes consist of the name of the element or complex type, a field with TBC words (Tree Branch Code), which are used for referencing the child-elements, and the tree branches which represent the references to the appropriate child-elements.

It is also possible to deduce from the draft that the TBCs break down into two components, namely a schema branch and an item of position data, where the schema data is derived from the elements which occur as child-elements in the schema, while the item of position data contains the position data for those elements which can occur repeatedly. Here, the possible types of child-element are elements of the type Complex Type, which can contain child-elements, or elements of type Simple Type or Attribute, which cannot contain a child-element.

The length of the field #position is determined by the maximum number ("maxOccurs") of the element concerned, which is specified in the schema. To cover the situation that, in the example here, the maximum number is greater than 7 or is unbounded, the field is lengthened adaptively until it is possible to represent the position to be encoded. This breakdown has the property that the schema branch code or SBC #SchemaBranch code is always the same, regardless of how many children are or could be present in the current instantiation.

In order to move around within the document, the TBCs (i.e., the SchemaBranch codes and, where applicable, any PositionCodes), are put in sequence, which produces a path in the document. When the desired element is reached, the last code is inserted in the table. If the desired element cannot have any more children (i.e., is it is an Attribute or a Simple Type), then this termination code is unnecessary and is not sent. In this case, the Attribute or the Simple Type element is then transmitted in coded form.

Additional features and advantages of the present invention are described in, and will be apparent from, the following Detailed Description of the Invention and the Figures.

DETAILED DESCRIPTION OF THE INVENTION

The present invention basically uses of two different schema branch codes, of which one is far more frequently used and thus effects a compression, wherein the schema branch code and the position code are combined and the bit length for the schema branch code is transmitted with them. The search function is simplified in that the first part alone specifies the type of element referenced, and in that improved extendibility is achieved on the basis of a schema version number which must be transmitted together with fixed predefined extension strategies which are also known to the decoder.

Improvement in Compression

Figure 1A:
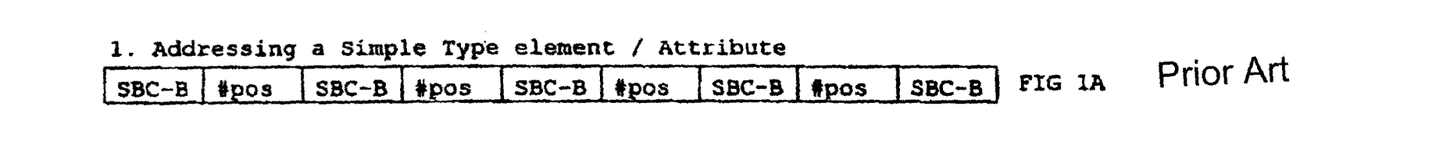
FIGS. 1a to 1d show the addressing of various element types to assist in explaining the improvement in compression.
Figure 1B:
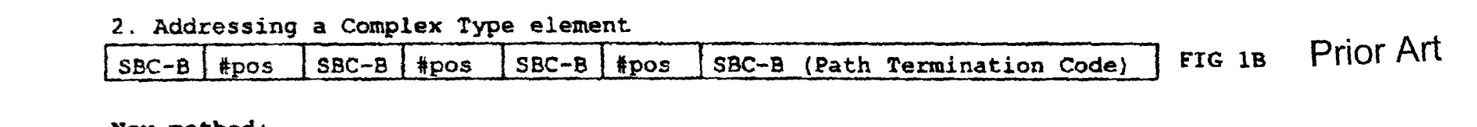
Figure 1C:
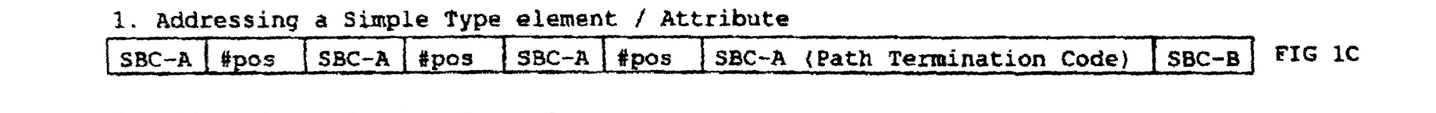
Figure 1D:
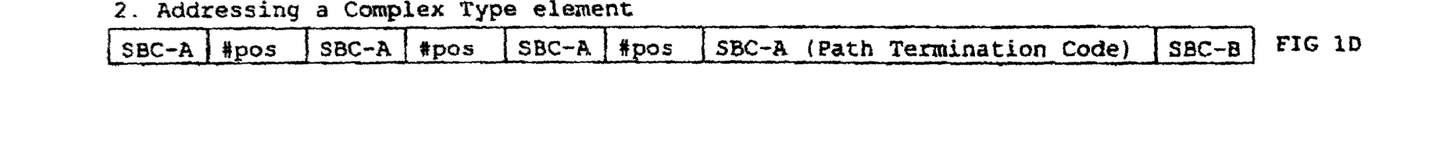

FIG. 1a shows a method used until now for addressing a Simple Type element or Attribute, and FIG. 1b shows a method of addressing a Complex Type element in a way corresponding to the familiar methods. FIGS. 1c and 1d show the corresponding forms of address using the method according to the present invention. This makes it clear that use is made of two different schema branch codes SBC-A and SBC-B, and not the general schema branch code SBC-B alone. As initially mentioned, such an address path consists of TBC codes chained together, wherein, if necessary, there also may be position codes #pos between the schema branch codes SBC-A, and only at the end will there be a schema branch code SBC-A with a path termination code and no further position specifications, followed by a general schema branch code SBC-B, which also may contain Simple Type elements or Attributes, which form the leaves of the tree-type structure.

From the structure described for the path, including chained TBC codes, it can be seen that only the last TBC of the path can refer to an Attribute or a Simple Type element. All the preceding TBCs must refer to Complex Type elements, because only these can have child elements. In the method according to the present invention, two different tables for the #SchemaBranch codes SBC are now introduced for each node, with the objective of reducing the length of the code for positioning within the document by comparison with that in the ISO/IEC draft mentioned above. Table A contains only the elements of Complex Type; that is, those elements which can have child elements. The other table contains all the elements; i.e., including the Attributes and the Simple Type elements. It should be noted that no SBC needs to be reserved for the path termination. The #SchemaBranch codes in the two tables are referred to below as SBC-A and SBC-B, respectively. The complete path is, in turn, formed by chaining together TBCs, with all the TBCs except the last being formed using SBC-A and, where applicable, the appropriate #Position codes. The end of the first part of the path, created using Table A, is signaled by a termination code; for example, all bits 1. There then follows exactly one TBC, the #SchemaBranch code for which is taken from Table B. It should be noted that, in the method according to the present invention, the termination code also must be sent if an Attribute or a Simple Type element is addressed. As the length of the #SchemaBranch codes depends on the number of possible elements, the codes in Table A (i.e., the SBC-A codes), are correspondingly shorter. The fact that the SBC-A codes are used significantly more frequently than the SBC-B codes also has an advantageous effect on the compression.

FIG. 2 shows an example of an XML schema text and FIGS. 2a and 2b show the associated node tables for SBC-A and SBC-B. From these, it is clear that the schema branch codes for the SBC-A can be shortened, because here there is no need to reference the Simple Type elements and Attributes.

Improved Search Function

A functionality which is required by the binary representation but which, with the method according to the ISO/IEC draft, cannot be used without restriction is a simplified search in the document for certain elements. Ideally, it should be possible to perform this search using a simple filter mechanism, by using a comparison against a bit pattern to search in the bitstream for a predefined bit sequence which uniquely addresses the element sought in the document. To search rapidly for a particular element in the document tree, the bitstream will then be parsed and closer attention will only be given to those elements which are addressed by the correct path fragment. For the method as carried out in the ISO/IEC draft, this type of filtering cannot be performed without restriction, because the length of the #Position codes cannot be determined in advance if there is at least one element in the schema for which the maximum number is greater than 7 or is unlimited.

In the method according to the present invention, the tree branching codes (TBCs) which specify the path are subject to a partial re-sorting, with the objective of enabling a simple filtering of the bitstream. This moves the #Position codes to the end of the path. The advantage of this is that the first part of the path, which contains the #SchemaBranch fragments, by itself specifies the type of the element referenced.

In an alternative solution, a first step separates the #Position codes into a part with a fixed length and a part with a variable length. In a second step, the parts with variable length are taken out of the TBCs and are moved to the end of the path.

With absolute addresses it is then possible, when searching for a particular element, to define the bit pattern in advance. When relative addresses are being used, the pattern depends on the current position within the document. For this situation, the new methods produces a simplification in that the #Position codes do not need to be decoded and analyzed for filtering purposes.

For a complete reference, the complete path including the complete #Position codes must be read and decoded to enable correct branching at each node into the child-element referenced.

To simplify the implementation of this method, it is possible to send at the start of the path a specification of the overall length L of the path, typically in bits, excluding the #Position codes at the end, so that a pointer Z for the #Position codes can be simultaneously updated. As such, the correct positions can be decoded in parallel with the SBCs. In addition, this also will make possible a search of particular positions (#Positions) for the elements sought, and will support a search in the case of extendibility, as explained below, in which a part of the path is not known to every decoder.

Figure 3A:
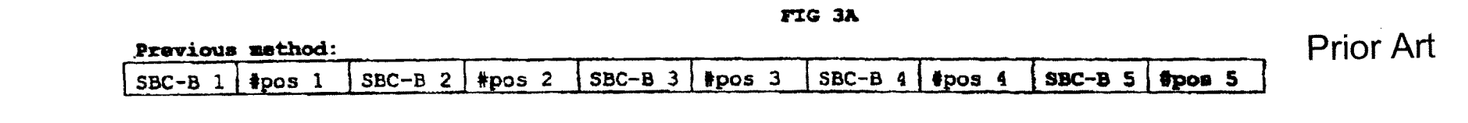
FIGS. 3a and 3b show diagrams to explain an improvement in the search possibilities in accordance with the present invention.
Figure 3B:
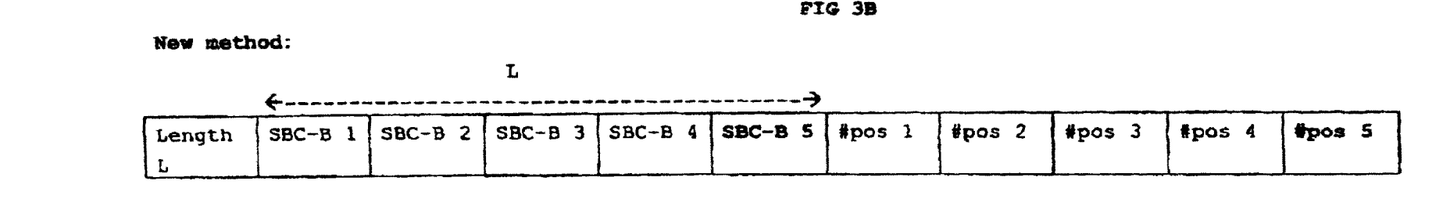

FIG. 3a illustrates these relationships by an example of the addressing of a Simple Type element or Attribute, under the previous method. FIG. 3b shows the corresponding example for the method in accordance with the present invention. From FIG. 3b it is clear that all the schema branch codes SBC-B1 . . . SBC-B5 for any particular path are arranged one after another and in total have a length L, which is transmitted at the very beginning as the first item. The position codes #pos 1 . . . #pos 5 are separated from the SBCs and are arranged one after another. The bit pattern for absolute addressing with a bit length of L can be determined from the schema definition, so that it is possible to filter the bitstream by comparing it against a bit pattern.

Improvement in Extendibility

The coding schema, on which the algorithm of the ISO/IEC draft is based, is context-sensitive; i.e., the coding in each element includes only those other possibilities defined by the context. The decoder can only read the bitstream and interpret it correctly if it knows the schema definition. The decoder must know which TBC code refers to which element, and how long the bit code in each element is, so that the correct number of bits is read for each path fragment.

A situation which will often arise in practice is that a defined schema is retrospectively extended, to take account of new conditions, such as new categories of metadata. These extensions can be optional elements or attributes. Documents held in XML text form, which were produced in accordance with the old schema definition, continue to be valid in relation to the new definition (forward compatibility). However, these also can be data types derived by inheritance which, in the case of a restriction (derived by restriction), retain the TBCs or, for an extension (derived by extension), are given an extended TBC table as described below.

However, in the binary representation of documents, such as are shown in the ISO/IEC draft, for example, this is not the case, because here new elements/attributes can be allocated TBCs which previously addressed other elements/attributes. In the method according to the present invention however, this disadvantage can be avoided by using the following rules:

New, optional, elements only can be inserted into the Tree Structure Nodes (TSNs) following existing elements, and only before any Path Termination Codes which may be present. When this is done, these new elements will be assigned schema branch codes (SBCs) which have not yet been assigned. In doing so, any existing elements will not lose their schema branch code assignments.

If the extension would lead to addressing which uses longer addresses, then any binary representations would no longer be decodable, due to the change in the code length. In order to solve this problem, and in accordance with the present invention the following addressing is introduced:

With respect to the schema branching code, new elements/attributes are entered after existing elements/attributes and before any existing path terminations in the tree structure nodes, TSN. In this case, if no more schema branch codes are available, then the addressing will be extended by one or more bits; for example, the most significant bit. For example, the existing codes will be extended by adding a zero. An exception is the Path Termination Codes, which are extended by 1 so that they remain the last code in the tree structure node. New elements/attributes are then assigned corresponding to the newly available schema branch codes, SBC.

The change in the bit length for the schema branch code must be signaled to the decoder. In order to make possible incremental extensions, preceding versions of the schema must be known to the decoder. For this purpose, it is not necessary to save all the information for the versions concerned. Instead, only the bit length or the number of schema branch codes for the new versions of an appropriately modified tree structure node need to be saved, and transmitted if necessary, where the second possibility may have advantages in enabling erroneous codes to be recognized. These details must be transmitted before the coded schema branch codes which have been changed. In this way, the bit lengths of the schema branch codes are linked to the version numbers of the schema. Before a document is binary encoded, it is then only necessary to specify the version of the schema used, and not to transmit the entire schema used as has been necessary until now.

For example, the bitstream definition of the ISO/IEC draft can be extended by adding a field for specifying the version. If no version check is carried out, a schema definition from a standard (for example, MPEG-7), can be used as a reliably known reference. This schema definition could be designated, for example, as version 1. An exemplary embodiment of such version details is given below:

In this case, both the version details and the bit length information are stored as additional items in the stream header, as this is specified in the ISO/IEC draft. For this purpose, the data as shown in FIG. 4a is stored in the datastream.

Figure 4A:
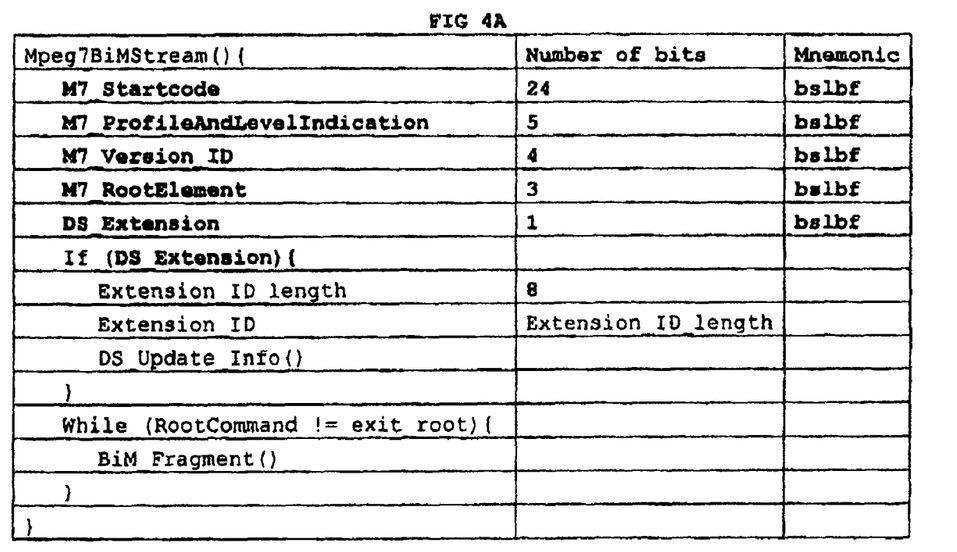
FIGS. 4a and 4b show sections of the data stream to explain the improvement in extensibility.
Figure 4B:
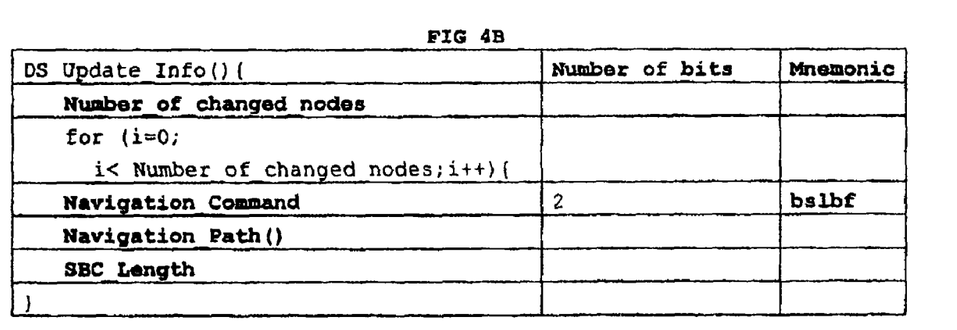

The standardized versions can be assigned a unique version identifier, which is designated M7_Version_ID in FIG. 4a. Furthermore, proprietary extensions can be identified by an extension identifier, which is designated Extension_ID in FIG. 4a. This can be specified even if the bit lengths of the extended tree structure nodes TSN are stored in the bitsteam. As shown in FIG. 4a, this is signaled by a flag, DS_Extension. The bit length information for the tree branch codes TBC of the extended tree structure nodes TSN is coded in the DS_Update_Info( ) specified in FIG. 4a, as shown in FIG. 4b. The expression Number_of_changed_nodes signals the number of tree structure nodes which have been changed. This number can be coded with a variable length, corresponding to the position data suggested in the ISO/IEC draft.

The information about the changed tree structure nodes can be addressed in the bitstream by a navigation command, Navigation_Command, and a navigation path, Navigation_Path. The change details transmitted thereafter then apply for all elements which are of the same type as the node addressed. After this, the changed codeword length SBC_Length or the changed number of schema branch codes is inserted into the datastream. The codeword length or number is again coded in accordance with the same method as used for coding the Number_of_changed_nodes.

In a further exemplary embodiment, the changed tree structure nodes can be identified by direct addressing of the Complex Types in the schema. This direct addressing can be achieved, for example, by numbering off the Complex Types defined in the schema.

There is a further problem in that a document coded in accordance with the new schema should be decoded by a decoder to which only the earlier schema definition is known (backward compatibility). In an XML textual document based on XML this is possible for elements which were already known under the old schema. This depends on two properties:

The elements of the complex type defined in the old schema continue to be retained, but can differ in the elements and attributes or the data types, as applicable, which they contain.

By using start and end markers for the elements, so-called Tags, new elements can be skipped and known ones decoded.

If the bit length change is transmitted for different versions, as specified in the above addressing proposal, then an "old" decoder which is working on the basis of an earlier schema still can decode known elements in an extended tree structure node. However, path specifications which lead to a new element cannot be skipped by the "old" decoder, and it cannot decode any further. In order to support this important functionality, the method according to the present invention uses the following alternatives for backward compatible coded documents:

a) If new elements/attributes are addressed in a TSN, then the transmission includes, in addition, at the start, the number of bits for the complete sub-tree or successor tree for this element/attribute, including the N bit content data which has been inserted. In this way, the decoder is enabled to skip over the next N bits, which are coded in a way unknown to it, and to land back in the known TSN again.
b) After the transmission of a path which contains a new element/attribute, a unique synchronization sequence is communicated, which the decoder can use to land back in the known TSN again.
c) Before transmitting any paths which contain new elements, their TSNs, which represent a part of a complete schema, must first be transmitted.
d) Before transmitting any paths which contain new elements, the complete schema must first be transmitted.

In the case of alternatives c) and d), the decoder also can decode the content of the newly appended documents and, where applicable, can save it or subject it to further processing.

Figure 5A:
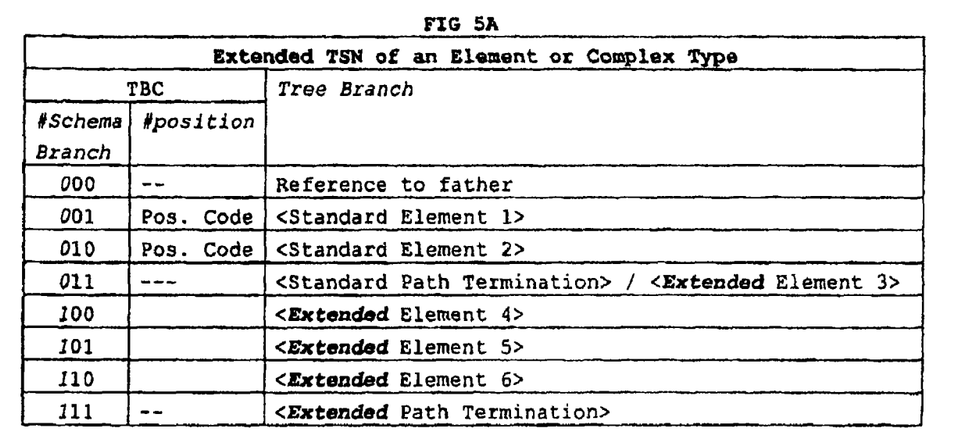
FIGS. 5a and 5b show representations of extended tree branch nodes to assist in explaining the improvement in extendibility.
Figure 5B:
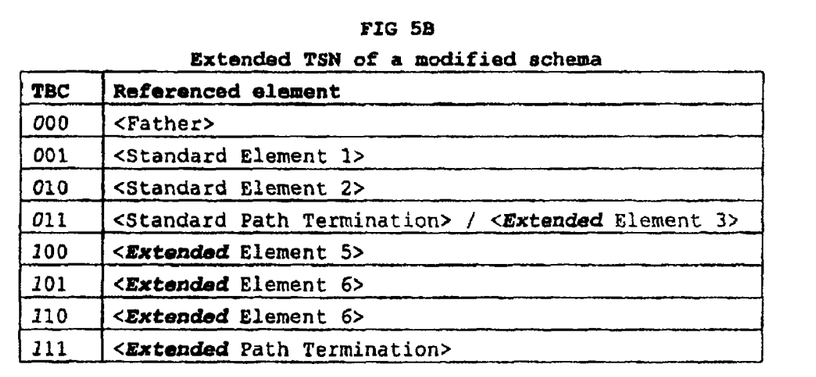

The example illustrated in FIGS. 5a and 5b shows the changes when there is a new version of a schema definition, with FIG. 5a showing an extended tree structure node for a Complex Type element and FIG. 5b showing an extended tree structure node for a modified schema. The elements 3 to 6 have been added in the new version. This causes the length of the schema branch code to increase from two to three. However, the previously-existing addresses are retained, they are simply extended by the addition of a zero as the MSB.

Figure 6A:
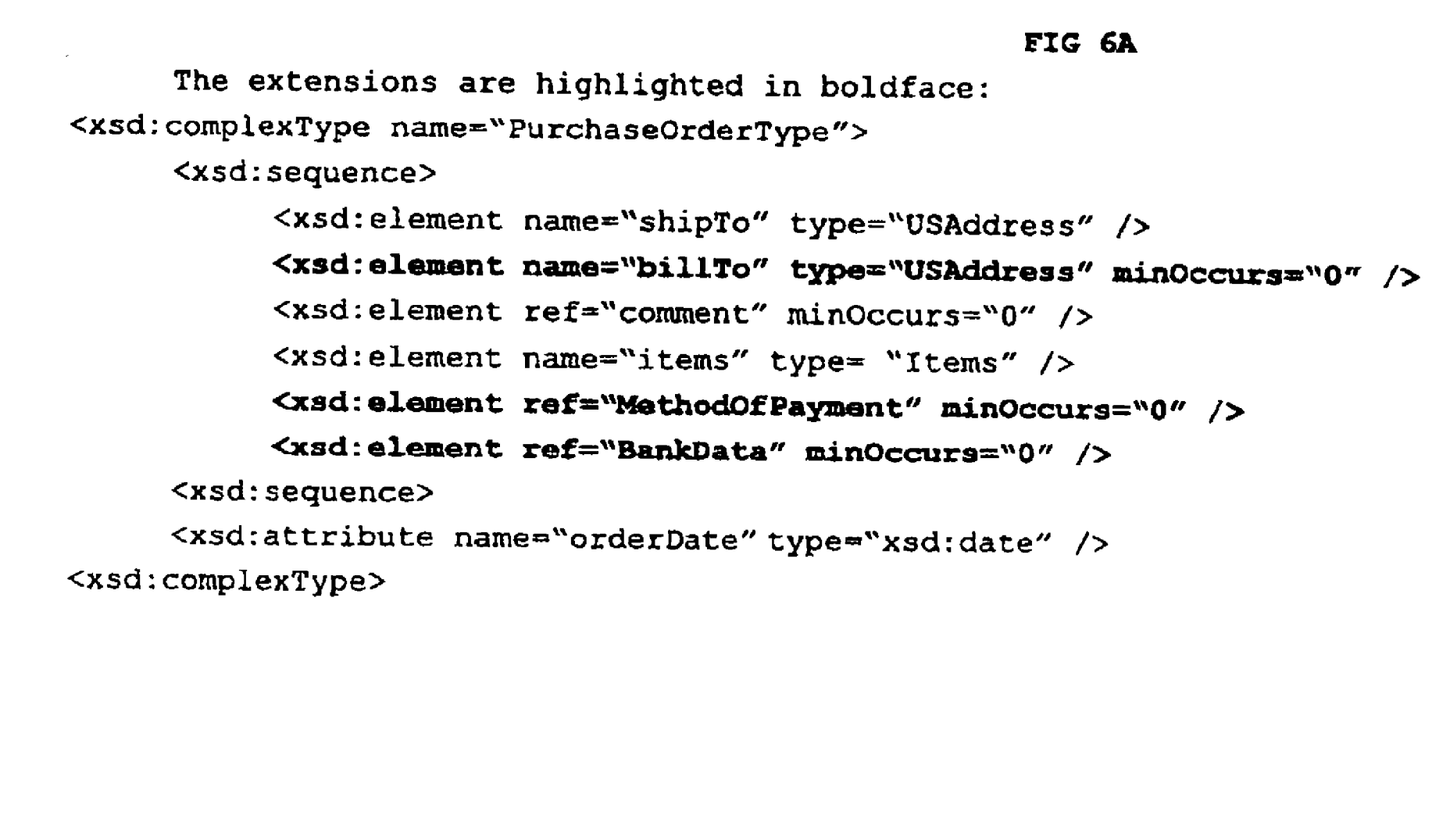
FIGS. 6a and 6b are similar to FIGS. 2 and 2b, but with extended elements.
Figure 6B:
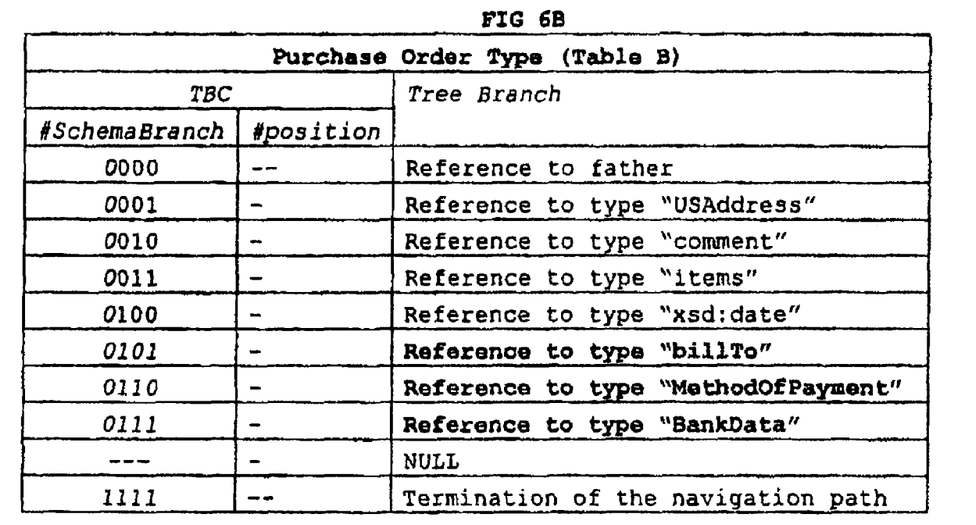

There follows an example of the coding of extended schema elements, shown in FIGS. 6a and 6b. Here, the example used in conjunction with FIG. 2 serves as the starting point. For reasons of simplicity, the method described above for splitting up the node table is ignored in this illustration. The original schema "PurchaseOrderType" is to be extended by a number of elements. In FIG. 6a, the elements which are extensions compared to FIG. 2 are highlighted in boldface.

That is to say, the elements "billTo", "MethodOfPayment" together with "BankData" are new insertions. The new tree branch code table therefore must be correspondingly extended. As a consequence, three bits is no longer sufficient to encode all the possibilities.

How this extension is effected using a tree branch code of four bits is itemized in more detail in FIG. 6b.

Under these general conditions, two cases are now dealt with:

Case 1:

Documents which have been coded in accordance with the old schema definition are transmitted to a decoder to which the new schema is known. The version number of the schema on which the coded document is based must be the first item communicated to the decoder. In this connection, the decoder has a table, in which is stored for each version number the bit width or the number of schema branch codes SBC for all the elements. Using this, the decoder determines that elements of type "PurchaseOrderType" are coded not with four bits but rather with only three bits. This information by itself permits it to decode the document correctly.

Case 2:

Documents which have been coded in accordance with the new schema definition are transmitted to a decoder which knows only the old schema. By reference to the version number of the schema, the decoder recognizes that unknown elements could be transmitted and that known elements could be coded with a different bit width. The new bit width of the elements must be known to the decoder, or else it would lose its synchronization with the encoder. Either the information assigning a bit width to the individual elements, such as a table, is transmitted before the actual document, or the decoder can access this information under a specified address (URI).

Figure 7:
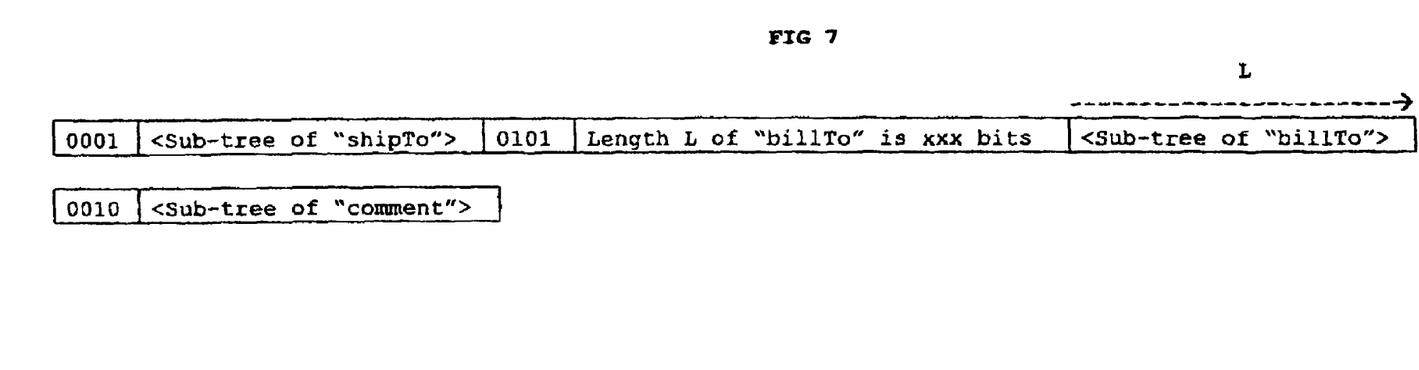
FIGS. 7 and 8 show a sequence for a decoder to skip over unknown elements.

Pursuant to the method according to the present invention, the encoder has four options for coding the document:

Option 1:

For each new element, the length of the corresponding sub-tree is transmitted, as shown in FIG. 7.

By reference to the schema branch code 0101, the decoder recognizes that the element addressed is not contained in the standard schema. Accordingly, it interprets the next bits as the length L of the unknown element. This length could be specified in accordance with the adaptive variable integer coding, as specified in the ISO/IEC draft. Using this length specification, it skips over the "billTo" sub-tree and resumes at the #SchemaBranch code 0010. The following element "Command" is then one which it is again able to decode.

Figure 8:
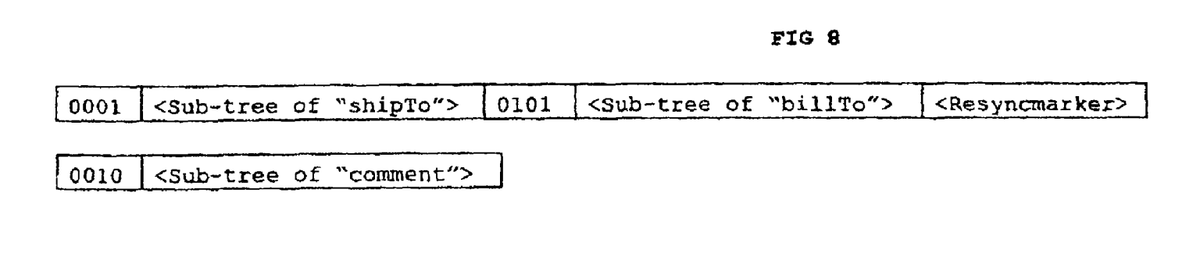

Option 2:

After a new element, a unique synchronization sequence is transmitted, as shown in FIG. 8. The decoder parses the bitstream until it finds a Resyncmarker as defined by the standard, from which point it continues the decoding. This method offers the possibility of coding a number of new elements without a break, and only transmitting the resync marker after the last of them.

Option 3:

The tree structure nodes which contain the new elements, together with their position in the document tree, are transmitted before the actual document. With this method, therefore, the schema which is known to the decoder is updated. The transmission of the document then takes place in accordance with the case that the schema is known. In addition, it can use the newly-transmitted schema to add the new elements to the ones of which it is internally aware, provided that a unique version number is assigned to identify the new schema.

Option 4:

A complete new schema is transmitted. In this case, the decoder can handle the document like one coded in accordance with a known schema. In addition, it can use the newly-transmitted schema to add the new elements to the ones of which it is internally aware, provided that a unique version number is assigned to identify the new schema.

The individual methods in accordance with the invention can be used independently of each other or in combination.

Although the present invention has been described with reference to specific embodiments, those of skill in the art will recognize that changes may be made thereto without departing from the spirit and scope of the present invention as set forth in the hereafter appended claims.

The invention is claimed as follows:

1. A method for improving functionality of a binary representation of an XML-based content description, wherein a structure of any instance of an Extensible Markup Language (XML) document corresponds to a tree-like data structure, the method comprising the steps of:

providing that each tree node represents an element of the content description and has a structure defined in a schema;

providing the tree nodes in the binary representation with tree branch codes;

providing that the respective tree branch code has a schema branch code and, when there are multiple occurrences of an associated child node based on the definition of the schema, a position code;

forming a first table for the schema branch codes when each node is being coded, wherein the first table contains only complex elements containing child elements, and a path termination code whose data structure permits a branch to child nodes;

forming a second table for the schema branch codes when each node is being coded, wherein the second table contains the complex elements as well as attributes and simple elements which represent leaves of the tree-like data structure, and wherein said attributes and simple elements do not contain child elements; and forming a complete path by chaining together tree nodes in the binary representation such that, except for a last node in the complete path, only the tree nodes in the first table are referenced, the last tree node is taken from the second table, and a penultimate node of the complete path contains a path termination code.

* * * * *